(12) United States Patent
Mayzlin

(10) Patent No.: US 7,400,768 B1
(45) Date of Patent: Jul. 15, 2008

(54) ENHANCED OPTICAL RECOGNITION OF DIGITIZED IMAGES THROUGH SELECTIVE BIT INSERTION

(75) Inventor: Isaac Mayzlin, Vista, CA (US)

(73) Assignee: Cardiff Software, Inc., Vista, CA (US)

( * ) Notice: Subject to any disclaimer, the term of this patent is extended or adjusted under 35 U.S.C. 154(b) by 587 days.

(21) Appl. No.: 09/938,804

(22) Filed: Aug. 24, 2001

(51) Int. Cl.
*G06K 9/34* (2006.01)
*G06K 9/46* (2006.01)
*G06K 9/50* (2006.01)

(52) U.S. Cl. .................. 382/177; 382/178; 382/201; 382/204

(58) Field of Classification Search ........... 382/197, 382/173, 177–190, 201, 245, 204, 257, 266, 382/267, 275; 358/1.9, 467
See application file for complete search history.

(56) References Cited

U.S. PATENT DOCUMENTS

| | | | | |
|---|---|---|---|---|
| 4,791,679 A | | 12/1988 | Barski et al. | 382/55 |
| 5,033,104 A | * | 7/1991 | Amano | 382/177 |
| 5,212,741 A | | 5/1993 | Barski et al. | 382/51 |
| 5,555,101 A | | 9/1996 | Larson et al. | |
| 5,729,635 A | | 3/1998 | Fast et al. | 382/254 |
| 5,748,807 A | * | 5/1998 | Lopresti et al. | 382/310 |
| 5,768,414 A | | 6/1998 | Jamali | 382/173 |
| 5,892,843 A | * | 4/1999 | Zhou et al. | 382/176 |
| 5,930,393 A | * | 7/1999 | Ho et al. | 382/225 |
| 5,943,137 A | | 8/1999 | Larson et al. | |
| 5,978,518 A | | 11/1999 | Oliyide et al. | 382/260 |
| 6,021,256 A | * | 2/2000 | Ng et al. | 358/1.9 |
| 6,201,613 B1 | | 3/2001 | Zhang et al. | 358/19 |
| 6,219,447 B1 | | 4/2001 | Lee | 382/168 |
| 6,249,604 B1 | * | 6/2001 | Huttenlocher et al. | 382/174 |
| 6,654,495 B1 | * | 11/2003 | Katoh et al. | 382/178 |
| 6,731,788 B1 | * | 5/2004 | Agnihotri et al. | 382/157 |
| 6,771,836 B2 | * | 8/2004 | Lawton | 382/260 |
| 6,865,290 B2 | * | 3/2005 | Kohchi | 382/165 |
| 6,867,875 B1 | * | 3/2005 | Kanai et al. | 358/1.15 |
| 2003/0012438 A1 | * | 1/2003 | Krtolica | 382/173 |

* cited by examiner

*Primary Examiner*—Brian Q Le
(74) *Attorney, Agent, or Firm*—Knobbe Martens Olson & Bear LLP

(57) ABSTRACT

The present invention describes a process for enhancing optical recognition of text in scanned documents. Prior to performing optical recognition for identification of text in scanned documents, a preprocessing algorithm identifies locations of noncontiguity in character strokes. The gaps created by noncontiguous character strokes are selectively filled with non-white or black pixels for enhanced character recognition. The process may assess noncontiguity on a bit-by-bit basis or, to reduce the number of operations, on a byte-by-byte basis.

22 Claims, 13 Drawing Sheets

Byte Length Enhancement Algorithm on the Original Image

The Image after Enhancement

Bitwise Enhancement Algorithm on the Original Image

The Image after Enhancement 3-bit Enhancement Algorithm on the Original Image

The Image after Enhancement

ENHANCED OPTICAL RECOGNITION OF DIGITIZED IMAGES THROUGH SELECTIVE BIT INSERTION

BACKGROUND OF THE INVENTION

1. Field of the Invention

This invention relates generally to the optical recognition of text, and more particularly, includes a method for enhancing the accuracy of character recognition in optical recognition systems.

2. Description of Related Technology

Optical text recognition algorithms perform character segmentation and subsequent recognition of the segmented characters, using neural networks, pattern recognition, and/or fuzzy logic. The algorithms convert the segmented portions of a bitmap image created from text to elements of a known character set, such as ASCII. Optical character recognition (OCR) algorithms, one form of optical text recognition algorithm, typically convert bitmap images of machine printed text, while intelligent character recognition (ICR) algorithms, another form of optical text recognition algorithm, typically convert bitmap images of hand printed text. One of the major factors affecting the accuracy of text recognition is the quality of the bitmap image. Common bitmap image enhancement methods perform such functions as smoothing, sharpening, edge detection and noise removal. All of these functions are designed to improve visual perception of the image by the human eye. Other special classes of image enhancement algorithms, referred to as OCR preprocessing algorithms, also improve the quality of the digitized text for subsequent recognition. These algorithms perform such functions as line removal, deskewing, color processing, and rotation for better segmentation of text, noise removal, thinning, thickening, and stroke restoration so as to modify the individual text characters into a more visually identifiable form. Recognition is typically increased in establishing characters that are more visually identifiable. Under certain conditions, however, either the triggers for invoking the preprocessing algorithms or image enhancement methods are not initiated or the goal is not conducive to good recognition. This can occur when a faulty printer head is used to print a document. The printer head may not put down ink over a portion of a character. If the document is subsequently digitized, it will show breaks in the character stroke of the bitmap image. This can also occur when a scanning device head is damaged or interfered with. When this situation occurs, an individual character may be seen as two or more separate characters or a single character stroke may be seen as two or more strokes.

SUMMARY

Aspects of the system and method describe a new preprocessing algorithm for performing noise removal and restoration of breaks in the character strokes with minimal impact on surrounding portions of the image. The advantage of this algorithm is that, in contrast to thickening, it minimizes the potential of adjacent character "touching". When adjacent characters touch, the segmentation process and therefore character recognition are negatively impacted. The preprocessing algorithm embodied in aspects of the present invention minimizes this problem while improving recognition of the characters due to selective pixel placement. Furthermore, in one embodiment, since this algorithm maintains pixel proliferation in vertical direction only, it ensures better feature extraction by linearly restoring the breaks in a character stroke.

The system and method improves optical recognition of text in electronic bitmaps by selectively placing dark pixels in the gap of noncontiguous character strokes. A computer receives the electronic bitmap as input from an optical scanning device. The bitmap is read to identify a vertical gap in image data between two image objects, each image object being located at the same horizontal position on the bitmap as the gap. The gap is measured to determine if the gap's vertical distance is within a predetermined maximum value. Vertically positioned gaps not exceeding this maximum value are determined to be breaks in character strokes. Selective pixel placement is made to the gap by reading one of the image objects vertically bounding the gap and writing the image object to gap locations. The bitmap, being essentially a table of bits and bytes arranged as columns and rows, is processed along each column in succession.

In one aspect of the invention, there is a method for improving optical recognition of text in an electronic bitmap including non-white pixels and white pixels through preprocessing of the bitmap in a computer, the method comprising a) receiving the bitmap, b) locating one or more bytes having no non-white pixels in the received bitmap, wherein the locating identifies gaps in character strokes, c) inserting bytes having non-white pixels into a series of bytes having no non-white pixels, and d) optically recognizing the bitmap for a predefined class of text characters.

In another aspect of the invention, there is a method for improving optical recognition of text in an electronic bitmap including white pixels and non-white pixels through preprocessing of the bitmap in a computer environment, the method comprising receiving the bitmap, reading a series of bytes in the bitmap, identifying in the read series at least one vertically adjacent byte containing all white pixels vertically bounded by bytes containing at least one black pixel, counting the number of the at least one vertically adjacent byte containing all white pixels, reading at least one of the bounding bytes and writing the read bounding byte to each of the at least one byte containing all white pixels when the number does not exceed a predefined maximum value, and optically recognizing the bitmap for a predefined class of text characters.

In another aspect of the invention, there is a method for improving optical recognition of text in an electronic bitmap including white pixels and non-white pixels through preprocessing of the bitmap in a computing environment, the method comprising receiving the bitmap, reading a series of bits in the bitmap, identifying in the series of bits at least one vertically adjacent white pixel bounded vertically by non-white pixels, counting the number of the at least one vertically adjacent white pixel, writing a non-white pixel to each of the at least one vertically adjacent white pixel when the number does not exceed the predefined maximum value, and optically recognizing the bitmap for a predefined class of text characters.

In another aspect of the invention, there is a method for improving optical recognition of text in an electronic bitmap including white pixels and non-white pixels through preprocessing of the bitmap in a computer environment, the method comprising receiving the bitmap; reading a subject bit in the bitmap; reading a right bit and a left bit, the right bit and the left bit being horizontally adjacent to the subject bit; grouping the right bit, left bit and the subject bit into a combination bit group; identifying at least one vertically adjacent combination bit group having all white pixels vertically bounded by combination bit groups containing at least one non-white pixel; counting the number of the at least one vertically adjacent combination bit group; reading at least one of the combination bit groups containing at least one non-white pixel and writing the read combination bit group to each of the at least one combination bit group containing all white pixels when the number does not exceed the predefined maximum value; and optically recognizing the bitmap for a predefined class of text characters.

In another aspect of the invention, there is a system to improve optical recognition of text in an electronic bitmap including non-white pixels and white pixels, the system comprising a computer environment; and a software program operating in the computer environment, comprising a receive module configured to receive the bitmap, an enhancement module configured to enhance the bitmap obtained from the receive module, wherein the enhancement module performs a contiguity analysis and selective insertion of pixels based on the contiguity analysis, wherein the contiguity analysis identifies gaps in character strokes, and a recognition module configured to recognize the text in the enhanced bitmap.

In another aspect of the invention, there is a method of improving optical recognition of text in an electronic bitmap including non-white pixels and white pixels through preprocessing of the bitmap in a computing environment, the method comprising a) receiving the bitmap, b) performing a contiguity analysis of the bitmap, wherein the contiguity analysis identifies gaps in character strokes, c) performing selective placement of non-white pixels into the bitmap so as to increase contiguity, and d) optically recognizing the bitmap for a predefined class of text characters.

In another aspect of the invention, there is a computer-readable medium containing instructions for controlling a computer environment to improve optical recognition of text in an electronic bitmap including non-white pixels and white pixels, by receiving the bitmap, performing a contiguity analysis of the bitmap, wherein the contiguity analysis identifies gaps in character strokes, performing selective placement of non-white pixels into the bitmap so as to increase contiguity, and optically recognizing the bitmap for a predefined class of text characters.

In another aspect of the invention, there is a program storage device readable by a machine, tangibly embodying a program of instructions executable by the machine to perform a method of improving optical recognition of text in an electronic bitmap including non-white pixels and white pixels, the method comprising receiving the bitmap, performing a contiguity analysis of the bitmap, wherein the contiguity analysis identifies gaps in character strokes, performing selective placement of non-white pixels into the bitmap so as to increase contiguity, and optically recognizing the bitmap for a predefined class of text characters.

In yet another aspect of the invention, there is a system to improve optical recognition of text in an electronic bitmap including non-white pixels and white pixels, the system comprising a) computing means for executing computer software, b) means for receiving the bitmap at the computing means, c) means for performing a contiguity analysis of the bitmap and means for performing selective placement of non-white pixels into the bitmap so as to increase contiguity, wherein the contiguity analysis identifies gaps in character strokes, and d) means for optically recognizing the bitmap for a predefined class of text characters.

BRIEF DESCRIPTION OF THE FIGURES

FIG. 3b is a top-level flowchart of the process of processing a form for enhanced character recognition such as performed on the system of FIG. 3a.

FIG. 4 is a flowchart of the first embodiment of the enhance module shown in FIG. 3a.

FIG. 5 is a flowchart of a second embodiment of the enhance module shown in FIG. 3a.

FIGS. 6a and 6b are a flowchart of a third embodiment of the enhance module shown in FIG. 3a.

DETAILED DESCRIPTION

Figure 1:
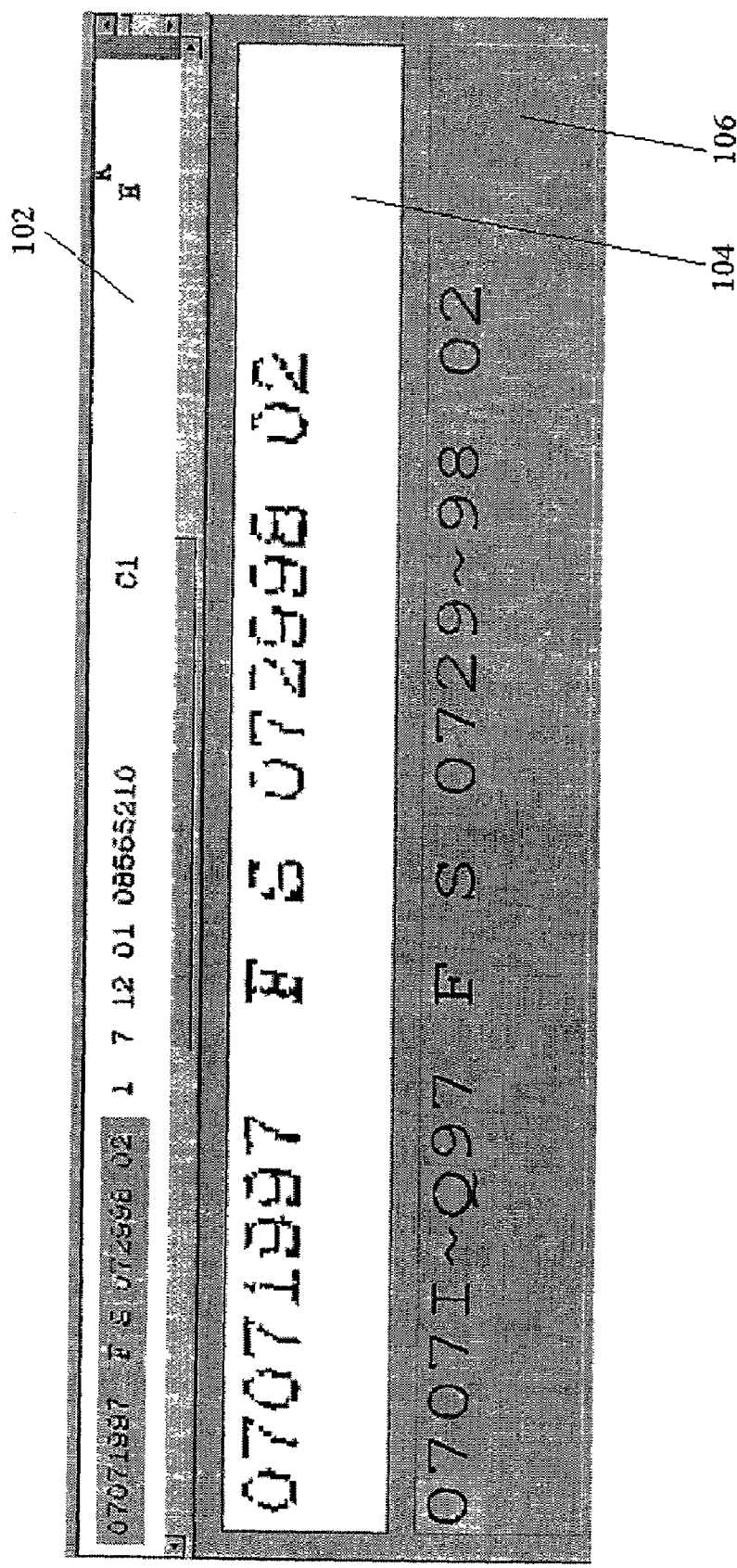
FIG. 1 is a diagram of an exemplary portion of a paper form before and after optical character recognition (OCR) without the use of a preprocessing algorithm prior to the OCR.

The following detailed description of certain embodiments presents various descriptions of specific embodiments of the present invention. However, the present invention can be embodied in a multitude of different ways as defined and covered by the claims. In this description, reference is made to the drawings wherein like parts are designated with like numerals throughout.

DEFINITIONS

The following provides a number of useful possible definitions of terms used in describing certain embodiments of the present invention.

A network may refer to a network or combination of networks spanning any geographical area, such as a local area network, wide area network, regional network, national network, and/or global network. The Internet is an example of a current global computer network. Those terms may refer to hardwire networks, wireless networks, or a combination of hardwire and wireless networks. Hardwire networks may include, for example, fiber optic lines, cable lines, ISDN lines, copper lines, etc. Wireless networks may include, for example, cellular systems, personal communication services (PCS) systems, satellite communication systems, packet radio systems, and mobile broadband systems. A cellular system may use, for example, code division multiple access (CDMA), time division multiple access (TDMA), personal digital phone (PDC), Global System Mobile (GSM), or frequency division multiple access (FDMA), among others.

A computer or computing device may be any processor controlled device that permits access to the network, including terminal devices, such as personal computers, workstations, servers, clients, mini-computers, main-frame computers, laptop computers, a network of individual computers, mobile computers, palm-top computers, hand-held computers, set top boxes for a television, other types of web-enabled televisions, interactive kiosks, personal digital assistants, interactive or web-enabled wireless communications devices, mobile web browsers, or a combination thereof. The computers may further possess one or more input devices such as a keyboard, mouse, touch pad, joystick, pen-input-pad, and the like. The computers may also possess an output device, such as a visual display and an audio output. One or more of these computing devices may form a computing environment.

These computers may be uni-processor or multi-processor machines. Additionally, these computers may include an addressable storage medium or computer accessible medium, such as random access memory (RAM), an electronically erasable programmable read-only memory (EEPROM), programmable read-only memory (PROM), erasable programmable read-only memory (EPROM), hard disks, floppy disks, laser disk players, digital video devices, compact disks, video tapes, audio tapes, magnetic recording tracks, electronic networks, and other techniques to transmit or store electronic content such as, by way of example, programs and data. In one embodiment, the computers are equipped with a network communication device such as a network interface card, a modem, or other network connection device suitable for connecting to the communication network. Furthermore, the computers execute an appropriate operating system such as Linux, Unix, a version of Microsoft Windows, Apple MacOS, IBM OS/2, or other operating system. The appropriate operating system may include a communications protocol implementation that handles incoming and outgoing message traffic passed over the network. In other embodiments, while the operating system may differ depending on the type of computer, the operating system will continue to provide the appropriate communications protocols to establish communication links with the network.

The computers may contain program logic, or other substrate configuration representing data and instructions, which cause the computer to operate in a specific and predefined manner, as described herein. In one embodiment, the program logic may be implemented as one or more object frameworks or modules. These modules may be configured to reside on the addressable storage medium and configured to execute on one or more processors. The modules include, but are not limited to, software or hardware components that perform certain tasks. Thus, a module may include, by way of example, components, such as, software components, object-oriented software components, class components and task components, processes, functions, attributes, procedures, subroutines, segments of program code, drivers, firmware, microcode, circuitry, data, databases, data structures, tables, arrays, and variables.

The various components of the system may communicate with each other and other components comprising the respective computers through mechanisms such as, by way of example, interprocess communication, remote procedure call, distributed object interfaces, and other various program interfaces. Furthermore, the functionality provided for in the components, modules, and databases may be combined into fewer components, modules, or databases or further separated into additional components, modules, or databases. Additionally, the components, modules, and databases may be implemented to execute on one or more computers.

Overview

Digitized images are obtained through a variety of devices, including an optical scanner, a facsimile machine and a digital camera. The former two devices require a hardcopy of the image prior to digitization. Both devices utilize a focused light to detect the presence or nonpresence of markings, blobs or image on the hardcopy. The light is focused on the hardcopy within the limits of the device as defined by its resolution. Resolution is typically measured in dots per inch (dpi). A typical scanner or facsimile machine (referred to together as "scanning device") may have a 600 dpi resolution. Each square inch is broken down into a grid of 600 smaller areas or dots by 600 dots. The light thus focuses in on each dot. Variations to the light caused by the presence of image are detected through mechanisms known in the art. Image detection is performed for each dot of the grid. The presence of markings may be recorded as a one whereas the nonpresence of markings may be recorded as a zero. The recorded matrix of zeroes and ones may be stored in an electronic file, displayed as a digitized image (bitmap) or manipulated by software.

In digitized images, text is not differentiated from graphics or other image illustrations. In the digitized image, what was previously text is now a matrix of black and white pixels or colored pixels culminating in a bitmap image. To convert portions of the bitmap image that were once text to elements of a known character set, such as ASCII, recognition algorithms such as optical character recognition (OCR) or intelligent character recognition (ICR) are used.

The system and method includes ways to enhance optical recognition of digitized images through selective insertion of bit elements (pixels) at calculated locations within a bitmap. Referencing FIG. 1, a portion of a paper form is shown at location or area 102. The magnified bitmap at location 104 shows characters with areas of missing dark pixels. Typically, dark pixels are black pixels for a black and white bitmap image. However, the dark pixels can be any non-white color. For the purposes of this description, a black and white bitmap image will be considered. Some of the missing black pixels are seen as breaks in the contiguity of character strokes. Other areas of missing black pixels are shown within the character strokes that do not break contiguity. The box at location 106 shows the results of recognition using OCR. In the example, preprocessing algorithms were not used to aid in the recognition of text. As shown, certain characters with noncontiguous character strokes were not recognized.

Figure 2:
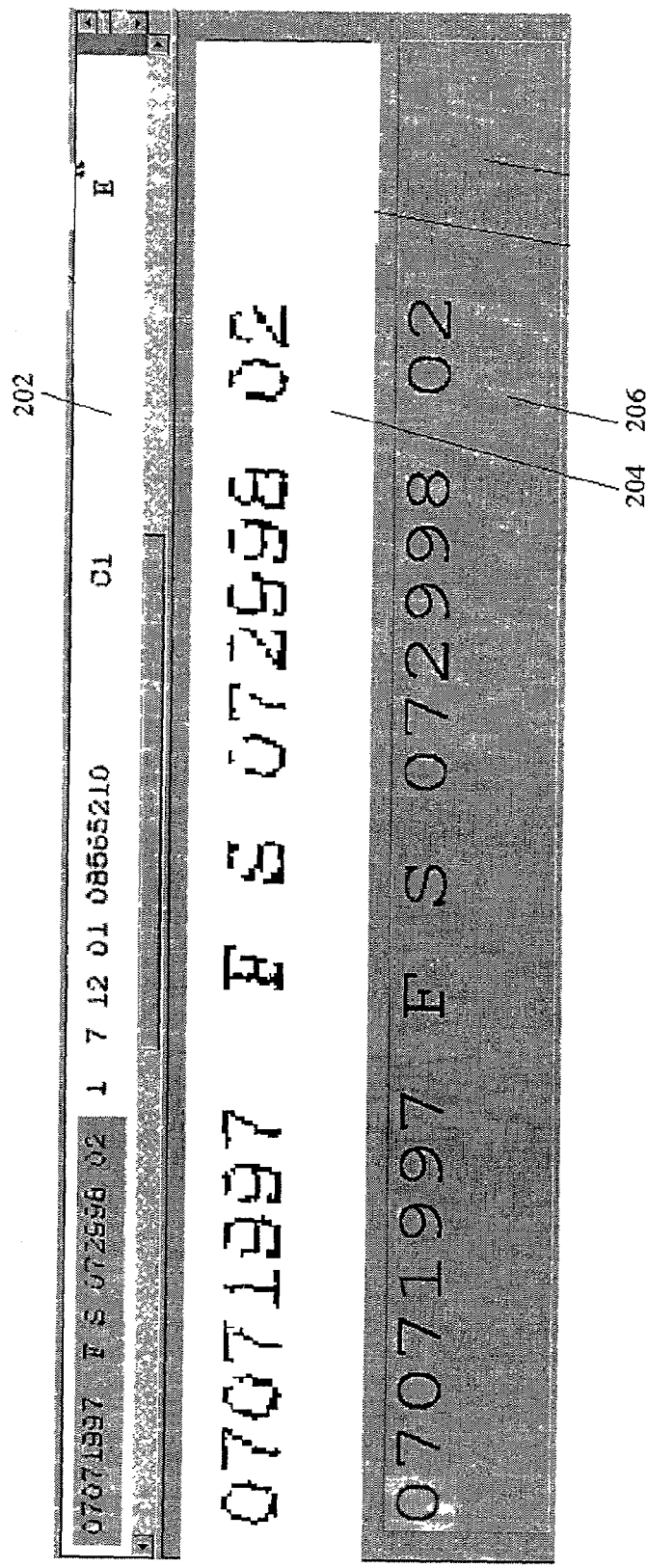
FIG. 2 is a diagram of the exemplary portion of the paper form shown in FIG. 1 before and after OCR with the use of a first embodiment of an enhancement module to aid in recognition of the text.

Referencing FIG. 2, the same bitmap from FIG. 1 is shown at location 202. The preprocessing algorithm described in the present system and method was applied to the bitmap prior to OCR resulting in a new bitmap at location 204. As can be seen at location 206, characters not recognized through OCR alone were recognized after the preprocessing algorithm of the present system and method was applied to the bitmap. The present system and method concentrates on restoring lost contiguity within character strokes for enhanced optical recognition.

System Components

Figure 3A:
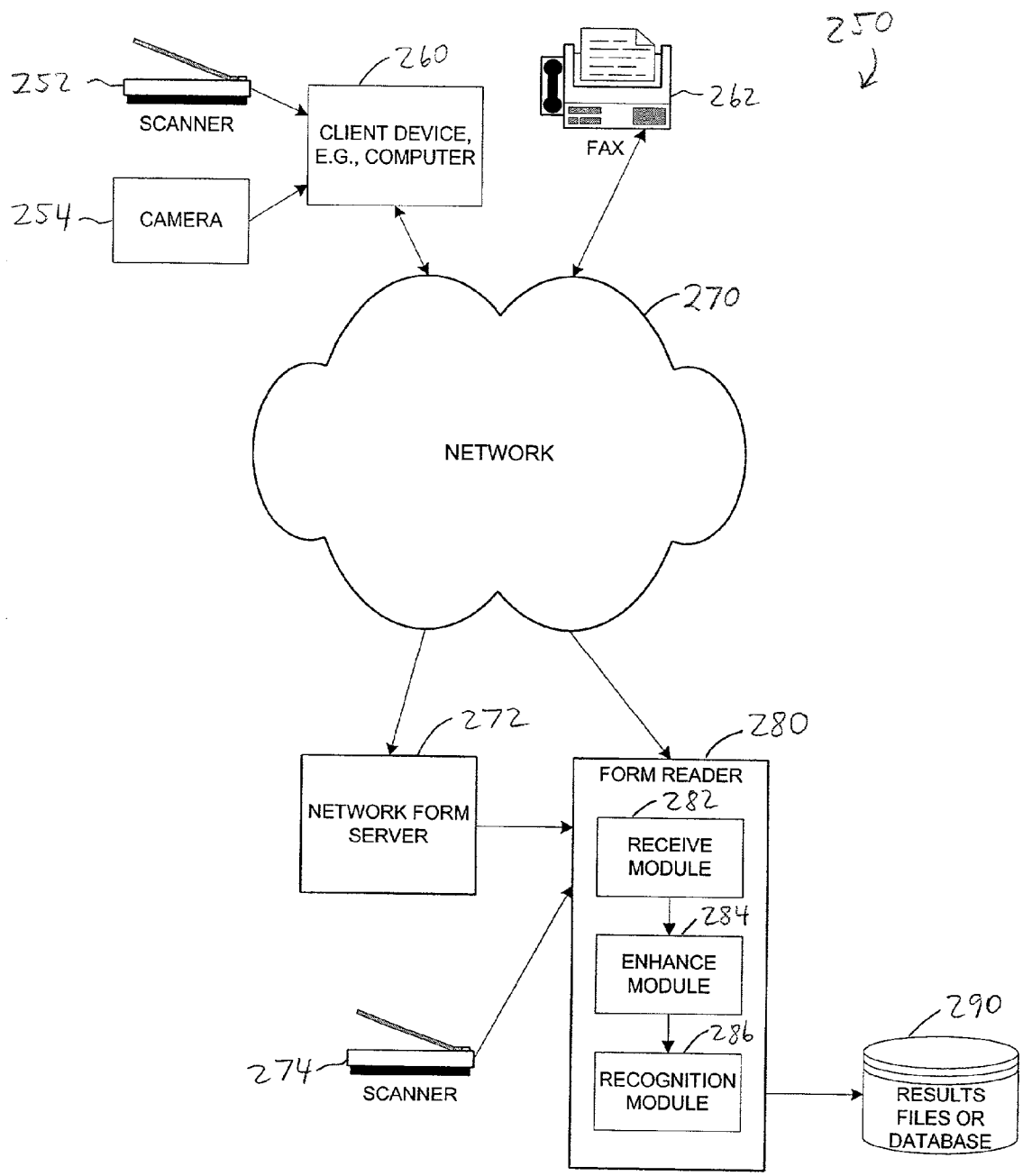
FIG. 3a is a block diagram of an exemplary system configuration of the components of a system and method for enhancing recognition of digitized images.

Referring to FIG. 3a, one embodiment of a system configuration 250 of the components of a system and method for enhancing recognition of digitized images will be described. However, various other types of electronic devices communicating in a networked environment may also be used. An end user communicates with a computing environment, which may include a network form server 272 and a form reader 280. An optical scanner 252 and/or a camera 254 are connected to or communicate with a client device 260. The camera 254 can be digital still camera or a video camera configured to provide digital images to the client device 260. Alternatively, the camera 254 can be an analog camera and the resultant images can be scanned by the scanner 252 to produce a digitized image to the client device. The client device 260 can be personal computer, a personal digital assistant (PDA), a laptop computer, a hand-held computer, a wireless telephone or other device configured to provide bitmaps of the images to a network 270. A facsimile machine 262 or other processing device configured to produce a facsimile signal is connected to the network 270.

The network form server 272, the form reader 280 and the client device 260 may each have any conventional general purpose single- or multi-chip microprocessor, for example a Pentium processor, a Xenon processor, an Athlon processor, a MIPS processor, a Power PC processor, an ALPHA processor, or other general purpose processors. In addition, the microprocessor may be any conventional special purpose microprocessor such as a digital signal processor or a graphics processor. Additionally, the network form server 272, the form reader 280 and the client device 260 may be a desktop, server, portable, hand-held, set-top, or other desired type of computing device. Furthermore, the network form server 272, the form reader 280 and the client device 260 each may be used in connection with various operating systems, including, for example, UNIX, LINUX, Disk Operating System (DOS), VxWorks, PalmOS, OS/2, Mac OS, a version of Microsoft Windows, or other operating system. The network form server 272, the form reader 280 and the client device 260 may each include a network terminal equipped with a video display, keyboard and pointing device.

Although FIG. 3a shows only one client device 260, the system configuration 250 may include any number of client devices. The network 270 can be any type of electronic transmission medium, for example, including but not limited to the following networks: a virtual private network, a public Internet, a private Internet, a secure Internet, a private network, a public network, a value-added network, an intranet, or a wireless gateway. The term "virtual private network" refers to a secure and encrypted communications link between nodes on the Internet, a Wide Area Network (WAN), Intranet, or any other network transmission means. In addition, the connectivity to the network 270 may be via, for example, a modem, Ethernet (IEEE 802.3), Token Ring (IEEE 802.5), Fiber Distributed Datalink Interface (FDDI), Asynchronous Transfer Mode (ATM), Wireless Application Protocol (WAP), or other form of network connectivity. The client device 260 may connect to the network 270 by use of a modem, a network interface card, or other mechanism for connecting the client device 260.

The network 270 further communicates with the network form server 272 and the form reader 280. An optical scanner 274 communicates with the form reader 280. Forms can be received at the form reader 280 from the network form server 272, from the network 270 or from the scanner 274. The received forms can be in a bitmap or other format. The form reader 280 includes a computer or computing environment and a software program operating in the computing environment. The software program includes a receive module 282 which provides a bitmap to an enhancement module 284 which further provides an enhanced bitmap to a recognition module 286. The enhancement module 284 performs a contiguity analysis of the bitmap and then performs selective placement of pixels into the bitmap based on the results of the contiguity analysis so as to increase contiguity of the text characters in the bitmap, as will be further described in conjunction with states 306-308 of FIG. 3b. The recognition module 286 can use recognition algorithms such as OCR or ICR to generate elements of the desired character set, e.g., ASCII. The results of the recognition module are stored in results files or a database 290.

Top Level

Figure 3B:
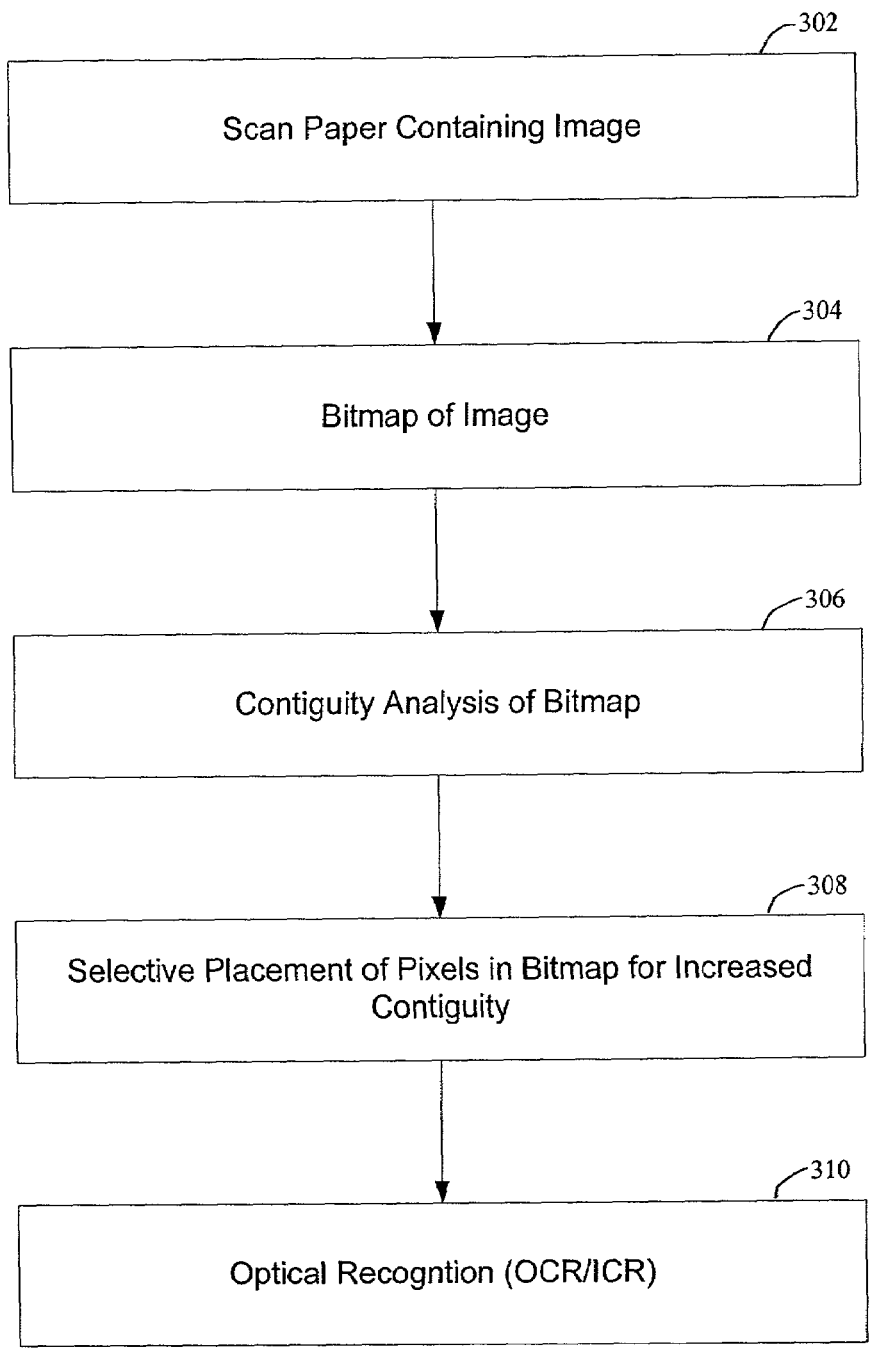

The top-level flow of the method is seen in FIG. 3b. At state 302, a sheet of paper or other scannable medium containing a text image is scanned using a scanning device. The scanning device produces a bitmap of the image at state 304. The bitmap, as described above, is a matrix of zeros and ones that represent the presence or nonpresence of the markings or image within a limited area of the bitmap, as defined by the resolution of the scanning device. After creation of the bitmap, a contiguity analysis is performed on the bitmap at state 306. The contiguity analysis examines all of the pixels of the bitmap. A computer processor is used to run the algorithm described below. The algorithm assesses all of the pixels of the bitmap in a calculated manner and provides a selective placement of black pixels in the image for increased contiguity at state 308. An increase in contiguity of text characters has been shown to beneficially affect recognition rates of character sets recognized through optical recognition techniques such as OCR or ICR. Three modifications of image preprocessing algorithms, described in the following sections, may be employed to increase recognition rates. A first algorithm may be based on a byte length assessment of the bitmap whereas a second algorithm may be based on a bitwise assessment of the bitmap. A third algorithm may use a multi-bit, e.g., 3-bit, combination on the bitmap. Each has certain advantages and disadvantages that are discussed below. Dynamic processing may be initiated to choose the algorithm that provides the greatest recognition results. Optical recognition using OCR or ICR 310 (or other recognition algorithm) is then initiated for final character recognition. The states of 306 and 308 assist the final state 310.

Byte Length Process

Figure 4:
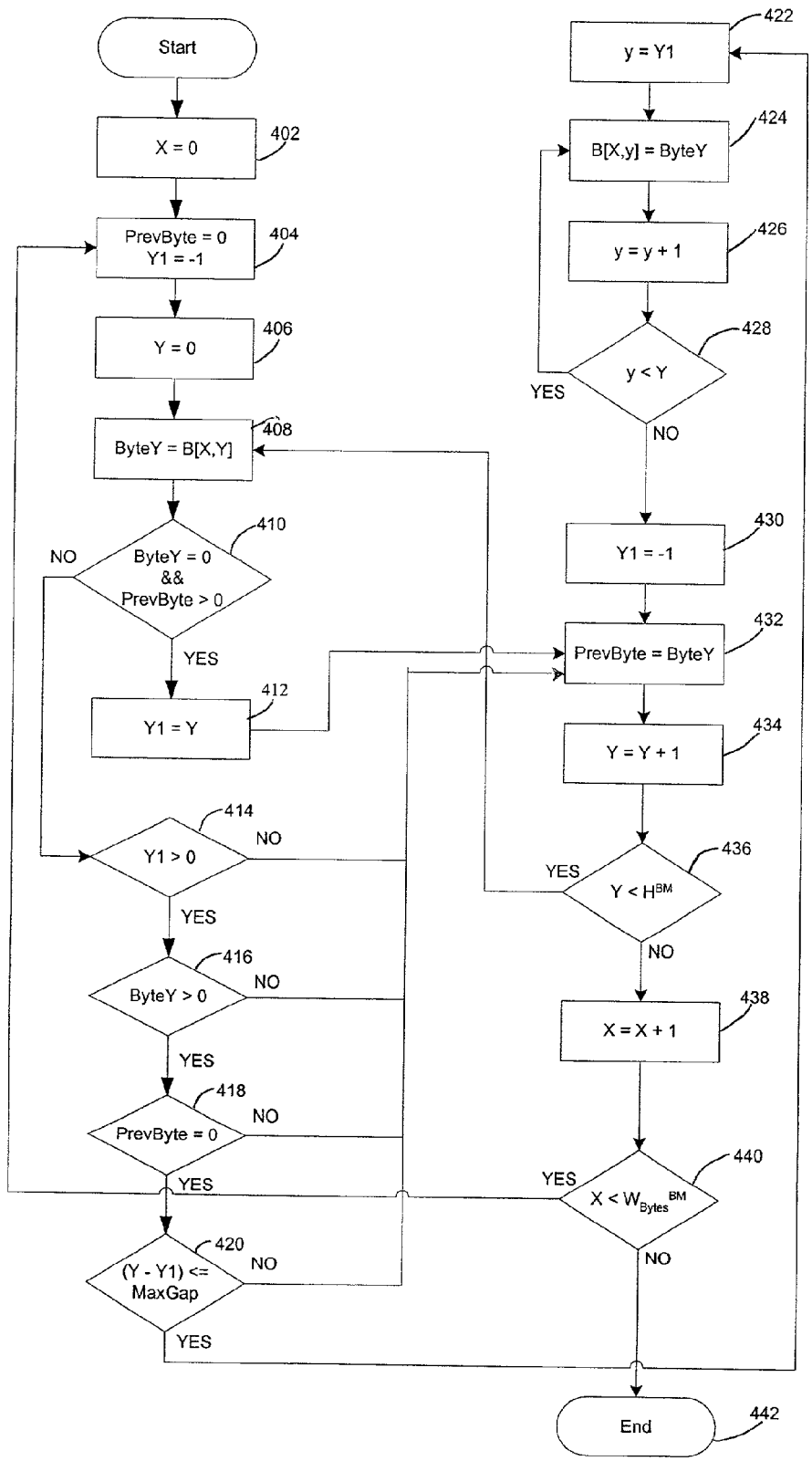

In one embodiment of the enhance module 284 of FIG. 3a and states 306-308 of FIG. 3b, a byte length assessment of the bitmap is made for determining selective placement of pixels for enhanced image recognition. Referring to FIG. 4, assessment of the bitmap is begun at one corner of the bitmap; e.g., the origin of (X,Y) coordinates. Each byte of the bitmap is assessed individually to determine if it contains image data. The bitmap is patterned into singularly discrete areas represented as bits and displayed as pixels. Black pixels depict the presence of image and white pixels depict lack of image. That is, white pixels are background or contain no information content, and are not just white paper or display background. In this embodiment, eight bits are assessed at one time. The bits and bytes are patterned as an array similar to the rows and columns of a spreadsheet. Contiguity of character strokes and thus the presence of data is assessed one column at a time. When vertically adjacent bytes are found having no image data, selective placement of black pixels are made to the bitmap within the subject column. When no image data is found for a predefined number of rows (e.g., a predefined maximum gap,) along the column, then selective placement of black pixels is not made. This occurrence is deemed to correspond with separate character strokes. Selective pixel placement is generally detrimental to recognition when the number of rows exceeds this predefined maximum gap.

The bitmap image consists of a two-dimensional array of bytes (each byte contains 8 bits) as described by the spreadsheet representation given above. A two-dimensional array B[X,Y] is expanded in physical random access memory (RAM) into a singular dimensional representation for simplicity of addressing the subject byte (the byte being analyzed for determination of image presence). The main variables of the FIG. 4 are shown in an example character shown in FIG. 7. Initializations are set at states 402, 404, and 406. At state 402, the abscissa coordinate, X of the subject byte, is set to zero, and at state 406, the ordinate Y is set to zero allowing the first byte in the bitmap to be assessed for image data. Images typically contain numerous bytes. An initial assignment of zero is given for the previous byte (PrevByte) at state 404. A byte-by-byte assessment is made of the bitmap images. At initialization, since no other bytes have been assessed, the assignment of zero is given. A zero value represents the presence of white pixels, only, and therefore no image data.

The subject byte, B[X,Y], is defined at state 408 and is represented as the variable ByteY. A decision state 410 assesses ByteY for image data (e.g., the presence of one or more black pixels in the byte). Also assessed for image data is the previous byte, PrevByte. The previous byte is the byte vertically adjacent to the subject byte that was previously assessed for image data; e.g., B[X, Y-1]. When the previous byte contains image data but the subject byte does not, the reasons may be related to either lack of contiguity in the character stroke or the boundary limits of the character stroke. A subject byte having no image data, as represented by a zero value, and a previous byte containing image data, as represented by a number from one to 255, causes an immediate assessment of the next byte in the present column. The remaining states are used to determine if the condition is related to lack of contiguity or the boundary limits of the character stroke. If it is related to contiguity, selective black pixel placement will be made to enhance the recognition process.

When either the subject byte contains image data or the previous byte does not, or neither contains image data, the subject byte is neither related to a lack of contiguity in the character stroke nor its boundary limit. The next byte is then assessed to determine the condition. This assessment continues along the same column when the vertical limits of the bitmap have not been exceeded. When the decision state 410 is given a true indication, the subject byte contains no image data while the previous byte does contain image data. This is the start of a possible gap in character stroke contiguity. A new variable, Y1, is used to define the vertical position of the byte that begins this possible gap in contiguity. The Y1 variable is assigned at state 412 and the next byte in the column is assessed for image data in this reiterative process at state 432. When the logical expression in the decision state 410 is not true (false), the process first checks at a decision state 414 if a prior iteration provided a true indication thereby initiating a gap sequence. When it is determined that a gap sequence does exist, the process checks the conditions of the subject byte and the previous byte. At a decision state 416, the subject byte is assessed for image data. When it contains image data, the previous byte is checked at a decision state 418 to determine if it was void of image data. A true indication at decision state 418 initiates a check of the gap size. The size of the gap created between bytes containing image data can be measured by the difference in vertical position between the subject byte, ByteY, and the first prior byte containing no image data (Y1). Thus, the gap (Y-Y1) is checked at a decision state 420 to ensure that that the present gap does not exceed the predefined maximum gap (MaxGap).

The selective placement of black pixels involves reading and writing the subject byte, ByteY, to the non-marking bytes situated in the gap. The first byte in the gap is located at Y1. If the present gap exceeds MaxGap as determined at decision state 420, the process proceeds to state 422. A vertical positioning variable, 'y', is assigned Y1, at state 422. At state 424, the subject byte located at vertical position Y is then written to the byte at vertical position 'y' (starting from Y1). The vertical position is incremented at state 426. A decision state 428 determines if the new vertical position is located above the subject byte and therefore within the gap. If the new vertical position defined by the incremented 'y' value remains within the gap, the subject byte is written to the non-marking byte located at that respective position. The reiterative loop copies the subject byte to each non-marking byte in the gap. To ensure proper logic at decision states 414-420, the variable Y1 is assigned a nonmeaningful value (−1) at state 430. This allows the process to begin searching lower down in the same column for locations of noncontiguous character strokes. When the last vertical position in the gap is reached, the vertical position of Y is incremented at state 434. The process loops to check for other occurrences of noncontiguous character strokes arising in the currently addressed column.

A continuing assessment is performed within the column to find locations of noncontiguity in character strokes. To do this, the subject byte, ByteY, is assigned to the value PrevByte at state 432 and the byte counter is incremented by one at state 434 bringing the pointer to the next byte in the column. A check is performed at a decision state 436 to determine if the next byte is situated within the limits of the vertical height of the bitmap image. Should this check result in a positive finding, the next byte in the column is assigned the subject byte at state 408 and is assessed for image data. If it is determined at decision state 436 that the next byte is not within the vertical limits of the bitmap image, then the bytes located in the next, adjacent column are assessed in a similar manner. The counter is incremented by one at state 438, moving the pointer one byte over in the direction of the abscissa for a check of image data in the adjacent column. A check is performed at a decision state 440 to determine if incrementing the byte position extends the position of the byte beyond the horizontal limits of the bitmap image. When it is determined that the last byte along the vertical (ordinate) and horizontal (abscissa) directions have been assessed, the program ends at an end state 442.

Bitwise Process

Figure 5:
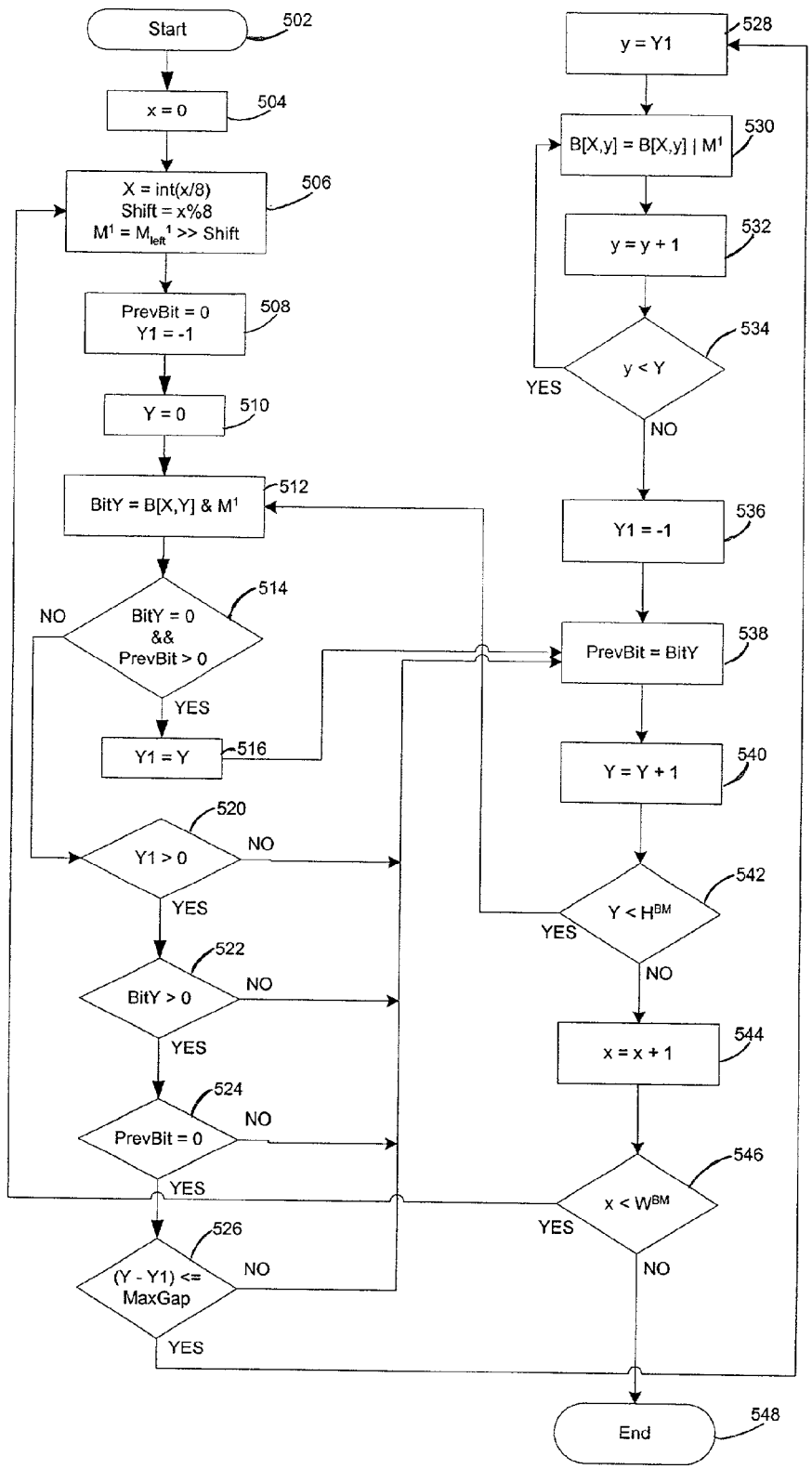
Figure 8:
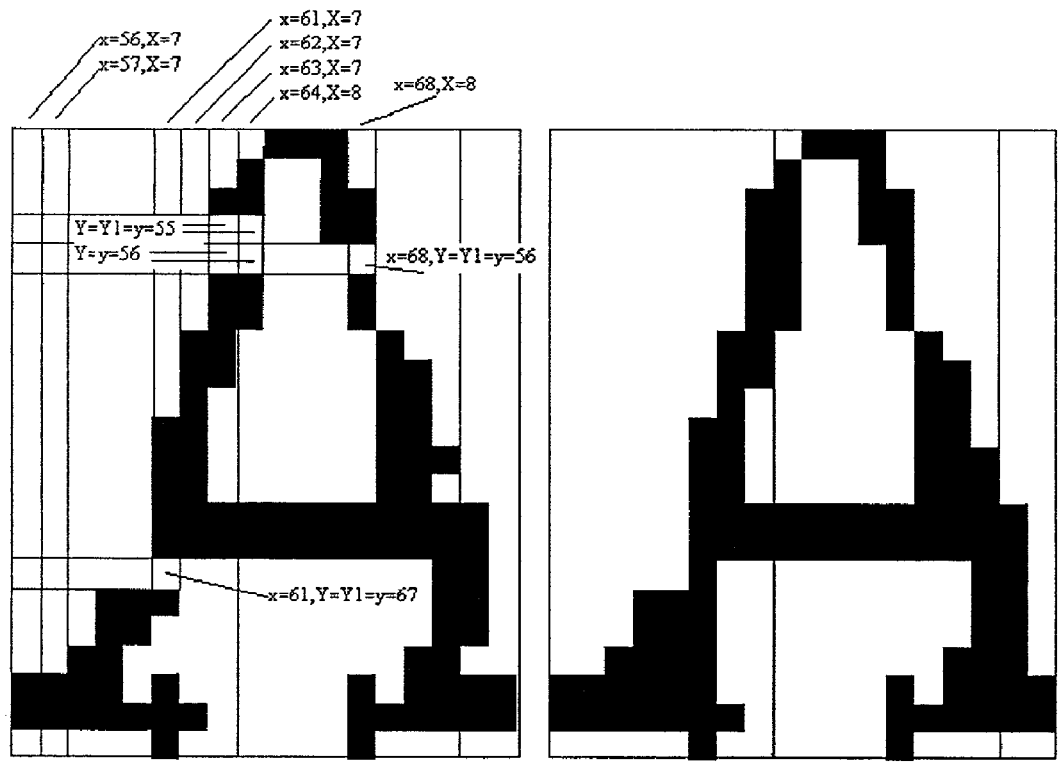
FIG. 8 is a diagram of an exemplary character before and after processing by the second embodiment of the enhance module as illustrated in FIG. 5.

In another embodiment of the enhance module 284 of FIG. 3a and states 306-308 of FIG. 3b, a bit-by-bit check for the presence of image (e.g., a black pixel) is performed in a manner similar to that of the byte length process. The process is shown in the flowchart of FIG. 5. The main variables of the FIG. 5 are shown in an example character shown in FIG. 8.

The process is started at state 502 with the first four states, 504, 506, 508, and 510 initializing the algorithmic variables. The initializations ensure that the placement of the pointer for assessing the first bit is positioned at the origin of the bitmap. The initializations also set up a routine for assessing each bit in its respective byte—one at a time. The variable 'x' defines the horizontal position of the subject bit in the bitmap. The calculation at state 506 defines the abscissa X of the corresponding byte and the position $M^1$ of the subject bit within the byte. At state 506 the function into takes the integral part of the argument, the % (modulo) operator calculates the remainder from division of the first operand by the second one, and the operation of right shift is performed on the binary constant $M^1_{left}$=10000000. For example, if x=29, then X=int(29/8)=3, Shift=29%8=5, $M^1$=10000000>>5=00000100.

The subject bit, BitY, is assigned at state 512, using bitwise logical AND operation '&'. The decision state 514 tests (operator && evaluates regular logical AND condition) for the absence of image data in the subject bit as well as the presence of image data in the previous bit, PrevBitY. In similarity to the byte length process, a finding that the subject bit does not contain the image data and the previous bit does contain image data sets the process in motion for determining the nature of the occurrence. The occurrence may relate to a break in the contiguity of a character stroke, whereby black pixels will be placed in the resultant gap, or the occurrence may relate to the boundary limits of the character stroke. To determine the nature of the occurrence, vertical positioning of the subject bit, Y, is assigned at state 516 to Y1. The subject bit becomes the previous bit at state 538 and the vertical position of the pointer is incremented at state 540. If the height of the bitmap has not been exceeded, as tested by a decision state 542, a new subject bit is assigned relative to the new vertical position, Y, and the decision state 514 is retested. In a second reiterative loop, the decision state 514 provides a false indication. That is because the previous bit will not contain image data, regardless of the state of the subject bit. A series of tests are performed at decision states 520 through 526 to determine: (1) if the decision state 514 was determined to be true in a previous iteration at decision state 520, (2) if the subject bit contains image data at decision state 522, (3) if the previous bit contains image data at decision state 524, and (4) if the gap separating the two bits containing image data exceeds a predefined maximum gap (MaxGap) at decision state 526.

When the vertical position of Y1 is not greater than zero, the vertical position of a subject bit was never assigned to Y1. This means that in the prior iteration, the decision state 514 was given a false indication signifying that the occurrence of image data (a black pixel) followed by the occurrence of non-marking data (a white pixel) has not taken place. Analysis for the occurrence of a noncontiguous character stroke is unnecessary. The process moves on to the next bit for reassessment.

When the subject bit does not contain image data, the gap between two black pixels cannot yet be determined. The vertical position of the second bit containing image data has not been reached. The process thus moves to the next bit.

At decision state 520, Y1 will be greater than zero if noncontiguity was previously assessed (e.g., the condition at decision state 514 was given a true indication) at a vertical range position preceding the present position but at the same point of the abscissa. If the previous bit contains image data, no gap exists and the process moves on to assess the next bit. An assessment of the previous bit for image data is made at decision state 524.

True indications given at decision states 520-524 indicate that a gap does exist between two black pixels. The decision state 526 determines the size of the gap. The gap is defined by the vertical position of the first bit found having no image data and the following bit assessed to contain image data (Y–Y1). When this gap is equal to or below the predefined maximum gap, selective bit placement is performed to fill the gap. A gap that exceeds the maximum allowed gap signifies two separate character strokes. The black pixels bounding the gap are deemed to be boundary elements of the two separate character strokes. Selective pixel placement is not needed and the next bit in the bitmap is assessed.

When any of the decision states 520-526 is given a false indication, the reiterative process moves on to assess the next bit, until the decision states 520-526 are given a true indication, initiating a possible gap sequence. The previous bit is assigned the value of BitY at state 538 and the vertical position is incremented at state 540. The new vertical position is checked to determine if it is within the vertical limits of the bitmap at the decision state 542. If it is not, the horizontal position is incremented by one at state 544 to reposition the pointer along the abscissa. A check is made by a decision state 546 to ensure that the horizontal limits of the bitmap have not been reached. If they have, the program ends at end state 548. If they have not, a new column of bits is assessed for image data. If the decision state 542 is given a true indication, the pointer remains at the same horizontal position and the adjacent bit is assigned and assessed for image data.

The selective placement of black pixels involves reading and writing the subject bit, BitY, to the non-marking bits situated in the gap; similar to pixel placement in the byte length process. The first bit in the gap is located at Y1. A vertical positioning variable, 'y', is assigned the value Y1, at state 528. At state 530, the subject bit located (using bitwise logical OR operation '|') at vertical position Y is then written to the bit at Y1. The vertical position is incremented at state 532. A decision state 534 determines if the new vertical position is located above the subject bit and therefore within the gap. If the new vertical position defined by the incremented 'y' value remains within the gap, the subject bit is written to the non-marking bit located at that respective position. The reiterative loop copies the subject bit to each non-marking bit in the gap. To ensure proper logic at the decision states 520-526, the variable Y1 is assigned a nonmeaningful value (–1) at state 536. This allows the process to begin searching lower down along the same abscissa position for locations of non-contiguous character strokes. When the last vertical position in the gap is reached, the vertical position of Y is incremented at state 540. The process loops to check for other occurrences of noncontiguous character strokes.

Figure 6A:
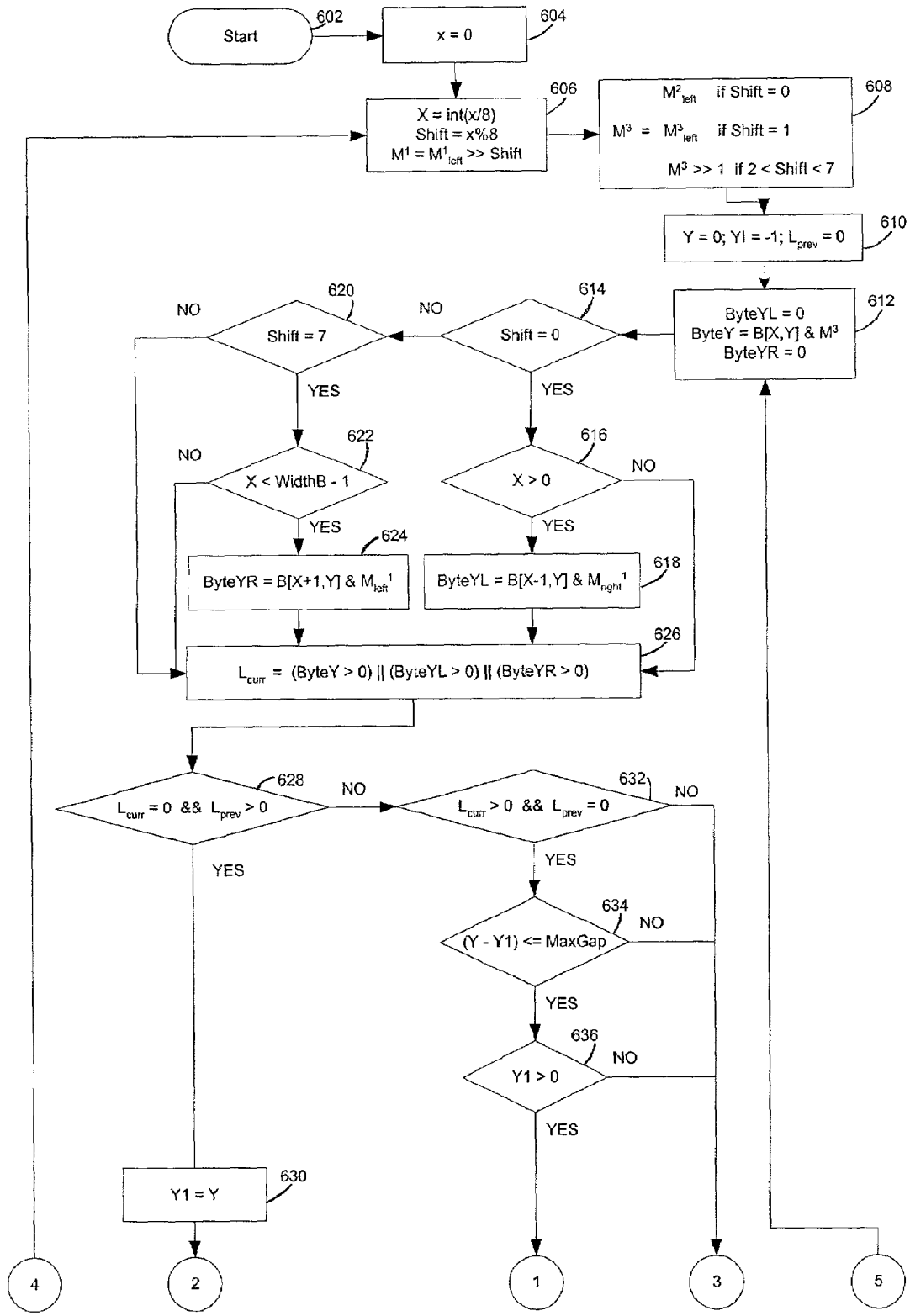
Figure 6B:
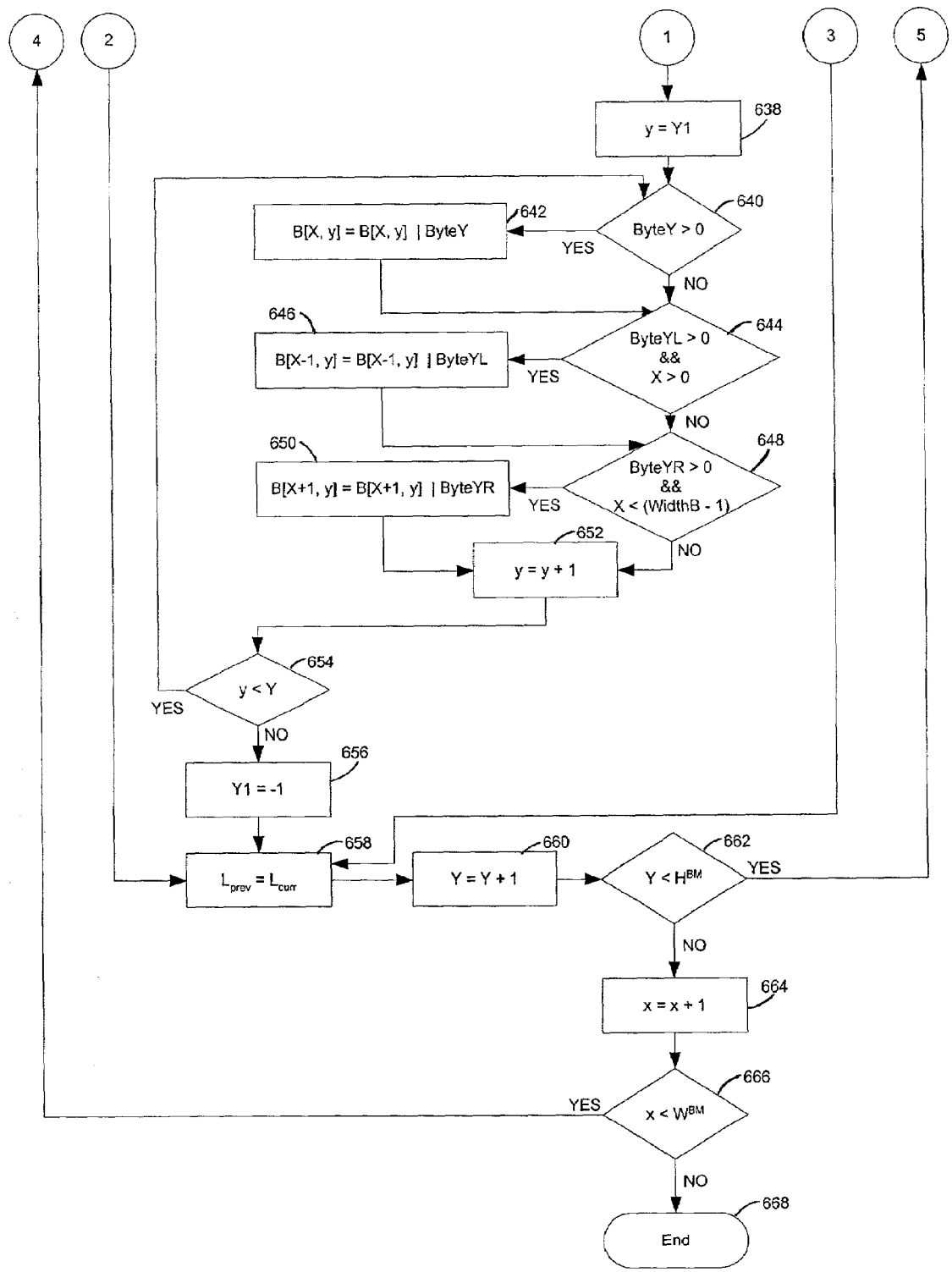

Multi-bit Process A flowchart for a third embodiment of the enhance module 284 of FIG. 3*a* and of states 306-308 of FIG. 3*b*, a multi-bit process, is shown in FIG. 6*a* and FIG. 6*b*. One embodiment of the multi-bit process is a 3-bit process which performs a bit-by-bit analysis of the bitmap image similar to that performed by the bitwise process. However, other embodiments may use a different number of bits than three. However, for each bit that is the subject of focus for a determination of image data, the bits horizontally adjacent are also assessed. If one or more of these 3-bit combinations; i.e., the focused bit and the two horizontally adjacent bits, have no image data and are vertically bounded by 3-bit combinations having at least one black pixel, then selective pixel placement is performed in the resultant gap. Pixels corresponding to the 3-bit combination that closed the gap are copied to the 3-bit combination(s) in the gap. Every bit of the bitmap is assessed for the presence of image data in the same manner.

Figure 9:
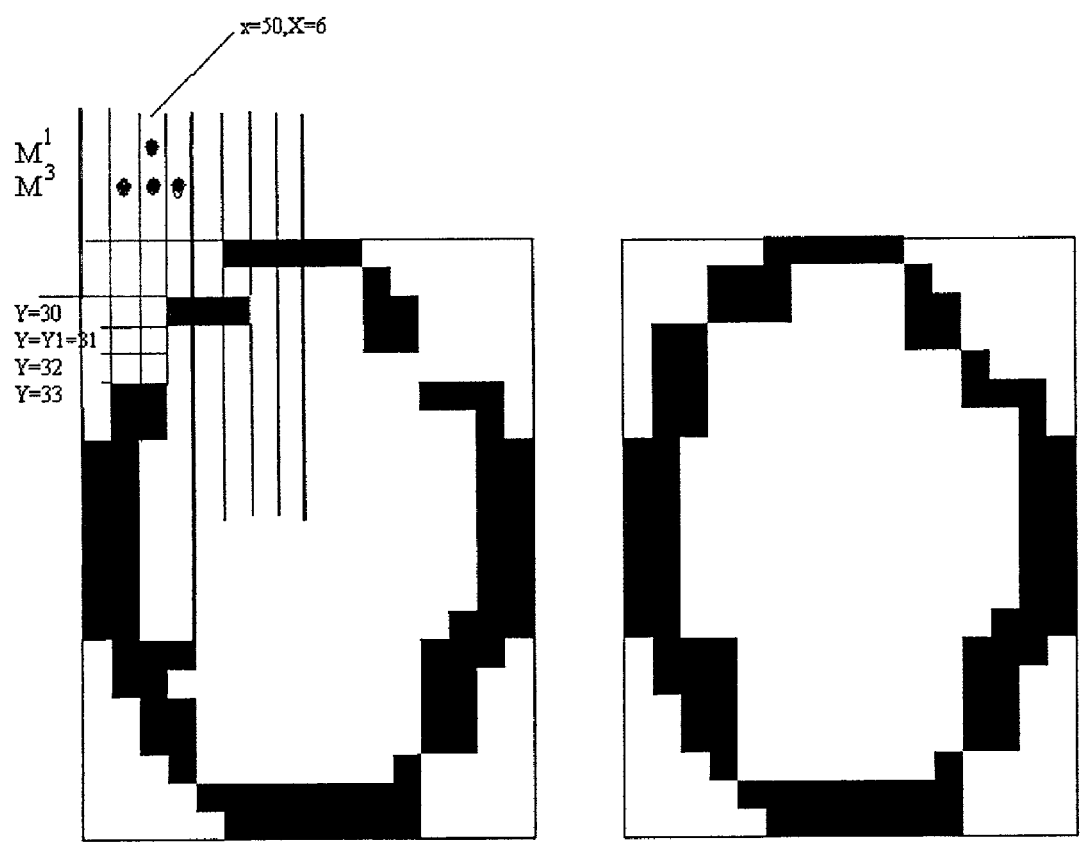
FIG. 9 is a diagram of an exemplary character before and after processing by the third embodiment of the enhance module as illustrated in FIGS. 6a and 6b.

The 3-bit process flows in a manner similar to the byte length and bitwise processes described above. The main variables of the FIG. 6*a* and the FIG. 6*b* are shown in an example character shown in FIG. 9. At initialization, the prime differences are the establishment of the 3-bit combination. The byte is broken down so that each individual bit is placed in focus at states 606 and 608, where three special binary constants are used: $M^1_{left}$=10000000, $M^2_{left}$=11000000, and $M^3_{left}$=11100000. The bit put in focus, the subject bit or ByteY, is defined at state 612 as are the horizontally adjacent bits, ByteYL, the left adjacent bit, and Byte YR, the right adjacent bit. The right adjacent bit and the left adjacent bit are defined at states 624 and 618, respectively. The logical variable, $L_{curr}$, is defined at state 626 and is used to test at a decision state 628 the existence of one or more black pixels in the 3-bit combination. The process continues from this point in a manner similar to the above-described embodiments. At decision state 628, a determination is made for the occurrence of a previous 3-bit combination having a black pixel followed by a 3-bit combination having only white pixels. When a true indication is given, certain checks of the bitmap boundaries are performed and certain variables are incremented to set up an assessment of the next vertically adjacent 3-bit combination, at state 630 and states 658-666. A negative indication will be received at decision state 628 for the next 3-bit combination tested. A set of decision states 632-636 perform tests similar to those of the above embodiments. Significantly, the decision state 634 performs a check to determine that the predefined maximum gap has not been exceeded.

When it is determined that a gap exists in a character stroke, the subject bit, left adjacent bit and right adjacent bit of the presently assessed 3-bit combination are tested at decision states 640, 644, and 648, respectively, to determine which of these bits contains a black pixel. If the subject bit contains a black pixel, it is written to the first bit in the gap at the same horizontal position at state 642. The reiterative process increments the gap position at state 652 and writes the bit to the next bit in the gap, should the gap exceed a one-bit distance. Every bit in the gap at the horizontal position of the subject bit is written in a similar manner in this reiterative process. Should the left adjacent bit or right adjacent bit contain a black pixel, similar reiterative writing steps are performed at states 646 and 650, respectively.

Comparison of Three Methods

One advantage of the byte length process may be that it reduces the number of operations by a factor of eight since each operation assesses one byte as opposed to a one-bit assessment in the bitwise process. Another advantage of the byte length process may be that it lessens the chance for missing a break in a character stroke. As discussed above, when a byte having no image data is bounded by bytes each having at least one black pixel bit and the resultant gap does not exceed the predefined maximum gap, the non-marking byte(s) are filled in with the bit sequence corresponding to the closing byte regardless of horizontal positioning of the respective black pixels of the bounding bytes. With the bitwise process, black pixels are only placed in the gap created by a break in character strokes if the bounding pixels are horizontally aligned. So, the bitwise process may not improve character strokes when breaks are such that the black pixels do not align. The byte length process may improve these types of breaks in character strokes.

The bitwise process offers the advantage of precision in pixel placement. The pointer assesses gaps in character strokes at each horizontal position on a bit-by-bit basis. When a gap is found between two black pixels it is filled in along the precise horizontal position where the gap was found. For the byte length process, the assessment in made on a byte-by-byte basis. Thus, only one black pixel need be found in each byte bounding a gap and the black pixel of each byte need not be positioned at the same horizontal position in order to fill the gap. The gap is filled with respect to the horizontal position of the black pixel(s) in the byte that closes the gap. Therefore, the placement of black pixels within the gap does not always establish uniformity as well as placement of black pixels in the bitwise process. Furthermore, the bitwise process may create a lower risk of including adjacent character strokes in the analysis when segmentation is too narrow or adjacent characters extend to close.

Figure 7:
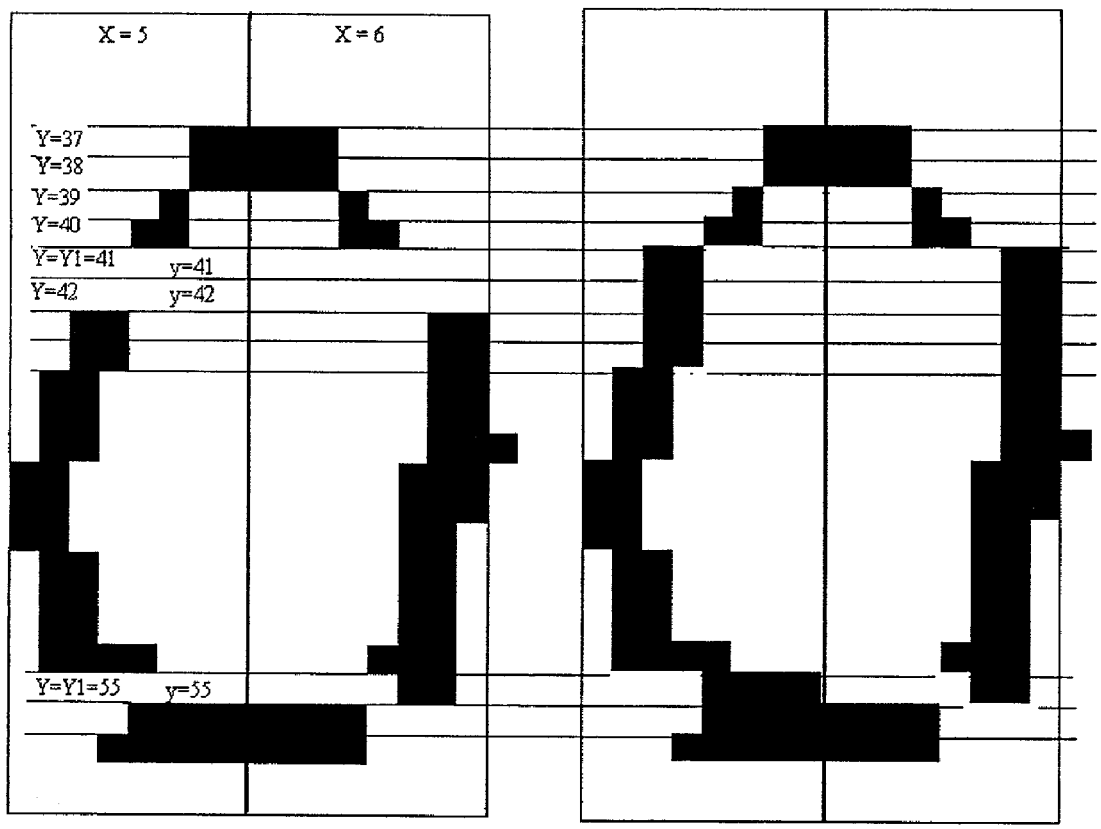
FIG. 7 is a diagram of an exemplary character before and after processing by the first embodiment of the enhance module as illustrated in FIG. 4.

FIG. 7 shows an enhancement of a bitmap using the byte length process. The image prior to preprocessing shows areas of lost contiguity in the character stroke. Most notably for byte X=5 at vertical positions Y=41 and Y=42, and at byte X=6 at the same vertical positions. It is shown in "Image after Enhancement" that these breaks in vertical contiguity are re-established after undergoing the byte length process. The bits of the gap closing byte at Y=43 do not align with the gap initiating byte at Y=40. As discussed above, an advantage of the byte length process as opposed to the bitwise process is that these types of contiguity breaks can be re-established.

Figure 10:
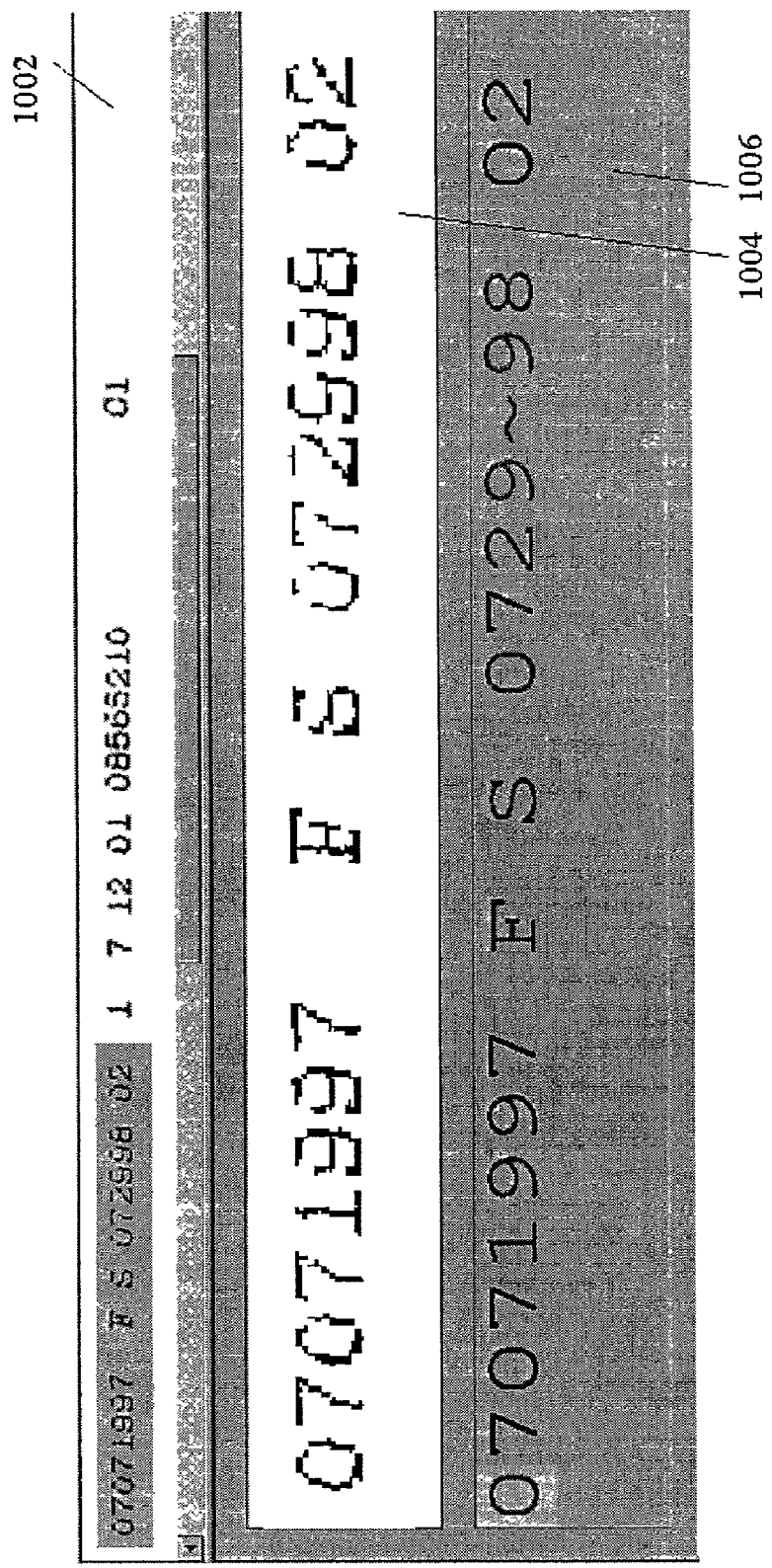
FIG. 10 is a diagram of the exemplary portion of the paper form shown in FIG. 1 before and after OCR with the use of the second embodiment of the enhance module to aid in recognition of the text.

FIG. 2, described at the beginning of the detailed description, shows enhancements to recognition after utilizing the byte length process. FIG. 10 shows enhancement of the same bitmap using the bitwise process. Analogous to FIG. 2, the magnified bitmap at location 1004 is shown after bitwise process and OCR results are shown at location 1006.

Figure 11:
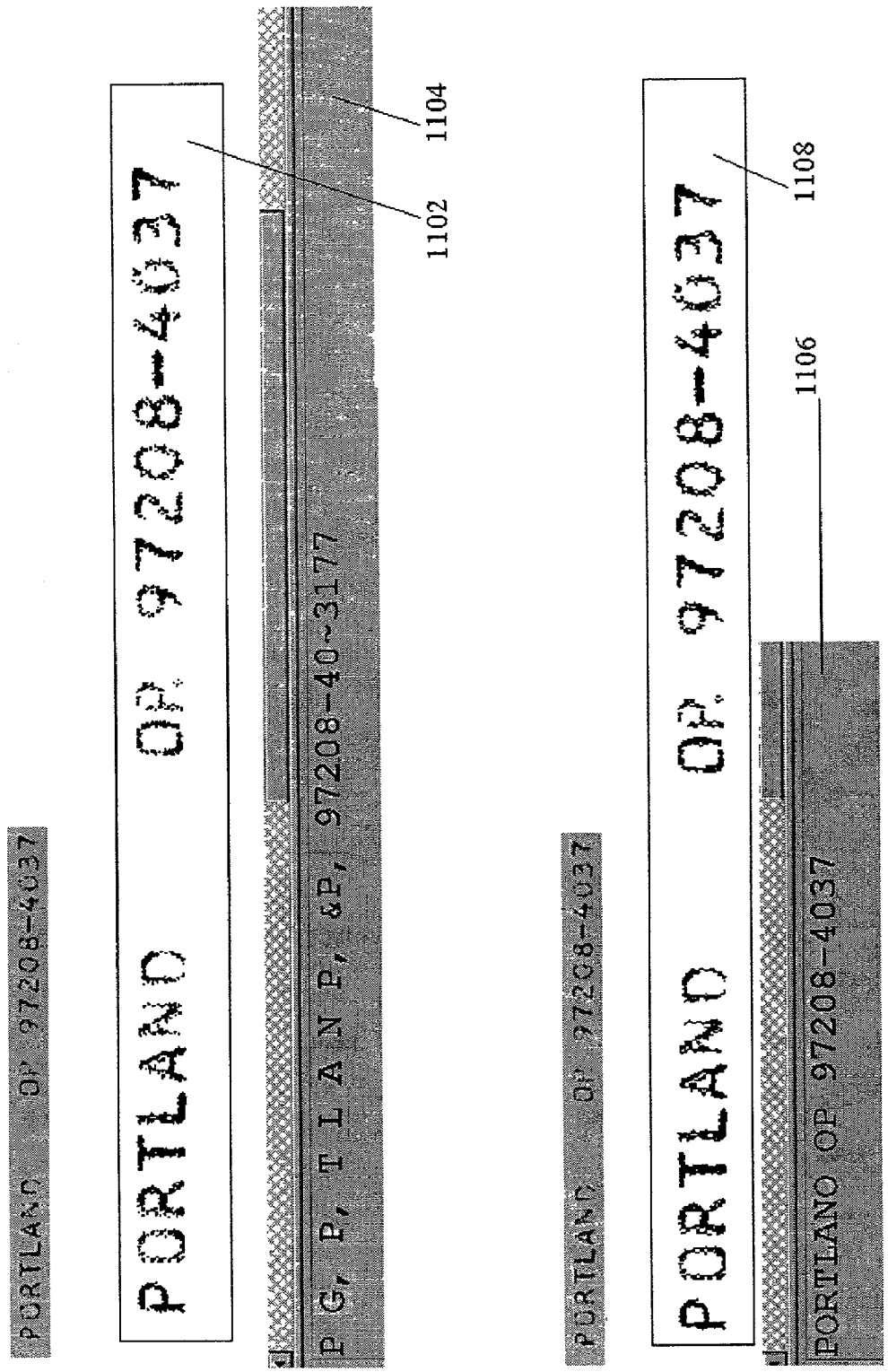
FIG. 11 is a diagram of the exemplary portion of the paper form shown in FIG. 1 before and after OCR with the use of the third embodiment of the enhance module to aid in recognition of the text.

A third embodiment is a compromise between the byte length process and bitwise process. The effectiveness of this method is shown in FIG. 11, where the original bitmap at location 1102 is enhanced in location 1108, and OCR results are shown before enhancement at location 1104 and after enhancement at location 1106 applying the multi-bit process.

SUMMARY

Thus, it is apparent that there has been provided in accordance with aspects of the present invention, a method for enhancing optical recognition of digitized images through selective bit or byte insertion to gaps in noncontiguous character strokes. Although several embodiment have been described in detail, it should be understood that various changes, substitutions, and alterations could be made herein. For example, selective pixel placement could be made by reading and writing the bit, byte or multi-bit combination sequence from the bit, byte or multi-bit combination that initiated the gap sequence. Furthermore, a different numbered combination of bits could be used. Other examples are readily ascertainable by one skilled in the art and could be made without departing from the intent and scope of the present invention as defined by the following claims.

What is claimed is:

1. A method for improving optical recognition of text in an electronic bitmap including non-white pixels and white pixels through preprocessing of the bitmap in a computer, the method comprising:
   a) receiving the bitmap;
   b) locating one or more bytes having no non-white pixels in the received bitmap, wherein the locating identifies at least one gap in a character stroke;
   c) inserting bytes having non-white pixels into a series of bytes having no non-white pixels;
   d) optically recognizing the bitmap for a predefined class of text characters;
   e) establishing a layout of the bitmap as a matrix of bytes, the matrix having columns and rows;
   f) identifying a series of bytes along the column having no non-white pixels;
   g) counting the number of bytes in the series of bytes;
   h) determining whether the number exceeds a predefined maximum value; and
   i) replacing each of the series of bytes with one of the bytes bounding the series of bytes when the predefined maximum value is not exceeded.

2. The method of claim 1, wherein the inserting of bytes having non-white pixels into a series of bytes having no non-white pixels eliminates at least a portion of the identified gap.

3. The method of claim 1, further comprising repeating f) to i) for the entire column and for all the columns of the matrix.

4. The method of claim 1, wherein each byte comprises eight bits and wherein each bit is displayed as a unique pixel.

5. The method of claim 1, wherein inserting bytes having non-white pixels into a series of bytes having no non-white pixels comprises eliminating at least a portion of the identified gap in a character stroke.

6. The method of claim 1, wherein the received bitmap comprises a plurality of bytes and wherein the locating of bytes having no nonwhite pixels comprises comparing vertically adjacent ones of the bytes of the bitmap.

7. The method of claim 1, wherein the gaps in a character strokes is a vertical gaps.

8. A method for improving optical recognition of text in an electronic bitmap including white pixels and non-white pixels through preprocessing of the bitmap in a computer environment, the method comprising:
- receiving the bitmap;
- reading a series of bytes in the bitmap;
- identifying in the read series at least one vertically adjacent byte containing all white pixels vertically bounded by bytes containing at least one black pixel;
- counting the number of the at least one vertically adjacent byte containing all white pixels;
- reading at least one of the bounding bytes and writing the read bounding byte to each of the at least one byte containing all white pixels when the number does not exceed a predefined maximum value; and
- optically recognizing the bitmap for a predefined class of text characters.

9. The method of claim 8, wherein the non-white pixels are black pixels in a black and white bitmap.

10. The method of claim 8, further comprising reading each byte in vertical succession for each byte-length column of bytes in the bitmap until the vertical and horizontal boundaries of the bitmap have been reached.

11. The method of claim 8, wherein the bitmap is optically recognized using optical character recognition (OCR).

12. The method of claim 8, wherein the bitmap is optically recognized using intelligent character recognition (ICR).

13. A method for improving optical recognition of text in an electronic bitmap including white pixels and non-white pixels through preprocessing of the bitmap in a computing environment, the method comprising:
- receiving the bitmap;
- reading a series of bits in the bitmap;
- identifying in the series of bits at least one vertically adjacent white pixel bounded vertically by non-white pixels;
- counting the number of the at least one vertically adjacent white pixel;
- writing a non-white pixel to each of the at least one vertically adjacent white pixel when the number does not exceed the predefined maximum value; and
- optically recognizing the bitmap for a predefined class of text characters.

14. The method of claim 13, further comprising reading each bit in vertical succession for each horizontal position of the bitmap until the vertical and horizontal boundaries of the bitmap have been reached.

15. A method for improving optical recognition of text in an electronic bitmap including white pixels and non-white pixels through preprocessing of the bitmap in a computer environment, the method comprising:
- receiving the bitmap;
- reading a subject bit in the bitmap;
- reading a right bit and a left bit, the right bit and the left bit being horizontally adjacent to the subject bit;
- grouping the right bit, left bit and the subject bit into a combination bit group;
- identifying at least one vertically adjacent combination bit group having all white pixels vertically bounded by combination bit groups containing at least one non-white pixel;
- counting the number of the at least one vertically adjacent combination bit group;
- reading at least one of the combination bit groups containing at least one non-white pixel and writing the read combination bit group to each of the at least one combination bit group containing all white pixels when the number does not exceed the predefined maximum value; and
- optically recognizing the bitmap for a predefined class of text characters.

16. The method of claim 15, further comprising reading in vertical succession each combination bit group in each three-bit length column of the bitmap until the vertical and horizontal boundaries of the bitmap have been reached.

17. The method of claim 16, wherein the three-bit length column includes a present column and a previous column, and wherein the reading of the combination bit group in vertical succession in the present column includes reading of the previous column's subject bit and right bit and wherein the subject bit in the previous column is the left bit in the present column and the right bit in the previous column is the subject bit in the present column.

18. A method of improving optical recognition of text in an electronic bitmap including non-white pixels and white pixels through preprocessing of the bitmap in a computing environment, the method comprising:
- a) receiving the bitmap;
- b) performing a contiguity analysis of the bitmap, wherein the contiguity analysis identifies at least one gap in a character stroke;
- c) performing selective placement of non-white pixels into the bitmap so as to increase contiguity; and
- d) optically recognizing the bitmap for a predefined class of text characters,
- wherein the contiguity analysis identifies a vertical gap in image data between two image objects, each image object being located at the same horizontal position on the bitmap as the gap, and
- wherein the gap is measured to determine if the vertical distance of the gap is within a predetermined maximum value.

19. The method of claim 18, wherein a vertically positioned gap not exceeding the predetermined maximum value is determined to be a break in a character stroke.

20. The method of claim 18, wherein the bitmap, arranged as columns and rows, is processed along each column in succession.

21. The method of claim 18, wherein the performing of selective placement of non-white pixels into the bitmap eliminates at least a portion of the identified gap and thereby increase contiguity.

22. A method of improving optical recognition of text in an electronic bitmap including non-white pixels and white pixels through preprocessing of the bitmap in a computing environment, the method comprising:
- a) receiving the bitmap;
- b) performing a contiguity analysis of the bitmap, wherein the contiguity analysis identifies gaps in character strokes, and wherein the contiguity analysis identifies a vertical gap in image data between two image objects, each image object being located at the same horizontal position on the bitmap as the gap, wherein the gap is measured to determine if the vertical distance of the gap is within a predetermined maximum value;

c) performing selective placement of non-white pixels into the bitmap so as to increase contiguity; and d) optically recognizing the bitmap for a predefined class of text characters.

* * * * *